United States Patent
Dellwo et al.

(10) Patent No.: US 7,390,532 B2
(45) Date of Patent: Jun. 24, 2008

(54) METHOD FOR THE PRODUCTION OF OPTICAL ELEMENTS WITH GRADIENT STRUCTURES

(75) Inventors: Ulrike Dellwo, Gusenburg (DE); Martin Mennig, Quierschied (DE); Peter W. Oliveira, Saarbrücken (DE); Helmut Schmidt, Saarbrücken-Güdingen (DE); Heike Schneider, Saarbücken (DE)

(73) Assignee: Leibniz-Institut fuer Neue Materialien Gemeinnuetzige GmbH, Saarbrucken (DE)

( * ) Notice: Subject to any disclaimer, the term of this patent is extended or adjusted under 35 U.S.C. 154(b) by 598 days.

(21) Appl. No.: 10/885,618

(22) Filed: Jul. 8, 2004

(65) Prior Publication Data
US 2005/0059760 A1    Mar. 17, 2005

Related U.S. Application Data

(63) Continuation of application No. PCT/EP03/00193, filed on Jan. 10, 2003.

(30) Foreign Application Priority Data
Jan. 10, 2002    (DE) ................ 102 00 648

(51) Int. Cl.
    *B05D 5/06* (2006.01)
(52) U.S. Cl. ............. 427/162; 427/164; 427/169; 428/412; 359/296; 359/290; 359/654

(58) Field of Classification Search ............ 427/162, 427/164, 169; 428/412; 359/296, 290, 654
See application file for complete search history.

(56) References Cited

U.S. PATENT DOCUMENTS

| | | | |
|---|---|---|---|
| 5,360,834 | A | 11/1994 | Popall et al. |
| 5,470,910 | A | 11/1995 | Spanhel et al. |
| 5,529,473 | A | 6/1996 | Lawton et al. |
| 5,552,261 | A | 9/1996 | Kraska et al. |
| 5,593,781 | A | 1/1997 | Nass et al. |
| 6,236,493 | B1 | 5/2001 | Schmidt et al. |
| 6,291,070 | B1 | 9/2001 | Arpac et al. |

FOREIGN PATENT DOCUMENTS

| | | |
|---|---|---|
| DE | 4133621 | 4/1993 |
| DE | 19524859 | 1/1997 |
| DE | 19719948 | 11/1998 |
| DE | 19746885 | 6/1999 |
| EP | 0414001 | 2/1991 |
| EP | 0636111 | 7/1998 |
| WO | 97/38333 | 10/1997 |

*Primary Examiner*—Alain L. Bashore
(74) *Attorney, Agent, or Firm*—Greenblum & Bernstein, P.L.C.

(57) ABSTRACT

A process for producing an optical element having a gradient structure, wherein a potential difference is generated in a nanocomposite material comprising nanoscale particles in a matrix material to cause a directed diffusion of the nanoscale particles in the matrix material and a concentration gradient of the nanoscale particles in the matrix material.

40 Claims, No Drawings

METHOD FOR THE PRODUCTION OF OPTICAL ELEMENTS WITH GRADIENT STRUCTURES

CROSS-REFERENCE TO RELATED APPLICATIONS

The present application is a continuation of International Application No. PCT/EP03/00193 filed Jan. 10, 2003, the entire disclosure whereof is expressly incorporated by reference herein, which claims priority under 35 U.S.C. § 119 of German Patent Application No. 102 00 648.2, filed Jan. 10, 2002.

BACKGROUND OF THE INVENTION

1. Field of the Invention

The present invention relates to a process for producing optical elements with a gradient structure. The optical elements are suitable in particular for holographic applications, planar gradient index lenses in imaging optics, head-up displays, head-down displays, optical waveguides, especially for optical communications and transmission technology, and optical data storage media.

2. Discussion of Background Information

U.S. Pat. Nos. 5,552,261 and 5,529,473 disclose utilizing the diffusion of monomers whose refractive index is greater or less than that of a surrounding liquid matrix in order to generate a refractive index gradient. This effect, which in the case of photopolymers is known as the Colburn-Haines effect, may lead, following subsequent polymerization, to a product featuring refractive index gradients. In the case of organic monomers, however, only a slight change in refractive index and hence an inadequate refractive index gradient is possible. Additionally, long process times are necessary, and there are high scattering losses.

WO 97/38333 describes optical components with a gradient structure or refractive index gradient, in which the gradient is formed by directed diffusion of nanoscale particles in a liquid matrix phase as a result of a potential difference. The gradient formed is subsequently fixed by polymerization/curing of the matrix. It is possible by this means to generate a pronounced refractive index gradient, but the process sequence for producing defined optical elements is often very complex.

It would be desirable to have available a simple, universally applicable and cost-effective process for producing optical elements with a gradient structure, in particular with a refractive index gradient.

SUMMARY OF THE INVENTION

The present invention provides a process for producing an optical element having a gradient structure. This process comprises:
  (a) providing a solid or gel-like nanocomposite material comprising a curable matrix material and nanoscale particles dispersed in the matrix material;
  (b) generating a potential difference in the nanocomposite material to cause a directed diffusion of the nanoscale particles in the matrix material and a concentration gradient of the nanoscale particles in the matrix material; and
  (c) curing the nanocomposite material comprising the concentration gradient to form the optical element.

In one aspect of this process, the nanocomposite material may be subjected to an electrical field.

In another aspect of the process, a difference in the interface potential may be generated in the nanocomposite material.

In yet another aspect, a difference in the chemical potential may be generated in the nanocomposite material, for example, by exposing the nanocomposite material to light such as, e.g., UV light and/or laser light. In another aspect, the difference in the chemical potential may be generated by irradiating the nanocomposite material with an electron beam.

In a still further aspect, the difference in the chemical potential may be generated by a holographic and/or a lithographic technique.

In another aspect, the process may comprise a thermal curing of the nanocomposite material and/or a photochemical curing of the nanocomposite material.

In another aspect, the solid or gel-like nanocomposite material may have a dynamic viscosity at 25° C. of from 2 to 1,000 Pas, e.g., from 5 to 500 Pas, or from 10 to 100 Pas.

In yet another aspect of the process of the present invention, the curable matrix material may comprise an organic polymer and/or a condensate based on one or more hydrolysable and condensable silanes and/or the curable matrix material may comprise a material prepared from one or more of a monomer, an oligomer and a prepolymer which is addition-polymerizable and/or polycondensable.

In another aspect, the curable matrix material may comprise a material which has been prepared from hydrolysable silanes of one or more of general formulae (I) and (II) and/or of precondensates derived from these silanes:

wherein the radicals X independently represent hydrolysable groups or hydroxyl groups;

wherein each radical R independently represents a non-hydrolysable radical which optionally carries an addition-polymerizable or polycondensable group, X is as defined above and a represents 1, 2 or 3.

In another aspect of the process, the nanoscale particles may have a diameter of not more than 100 nm, e.g., of not more than 50 nm, or of not more than 20 nm.

In another aspect, the nanoscale particles may comprise inorganic particles.

In yet another aspect, the solid or gel-like nanocomposite material may comprise from 0.1% to 50% by weight of nanoscale particles, e.g., from 1% to 50% by weight or from 5% to 30% by weight of nanoscale particles.

In a still further aspect, the solid or gel-like nanocomposite material may comprise, based on the total dry weight thereof:
  a) from 4.9% to 95.9% by weight of at least one organic polymer,
  b) from 4% to 95% by weight of a condensate of one or more hydrolysable and condensable silanes, with at least one silane having, optionally, a non-hydrolysable radical which is addition-polymerizable or polycondensable, the inorganic degree of condensation being from 33% to 100% and the organic degree of addition polymerization or polycondensation being from 0% to 95%,
  c) from 0.1% to 50% by weight of one or more kinds of unmodified or surface-modified nanoscale particles selected from oxides, sulphides, selenides, tellurides, halides, carbides, arsenides, antimonides, nitrides, phosphides, carbonates, carboxylates, phosphates, sulphates, silicates, titanates, zirconates, stannates, plumbates, aluminates and corresponding mixed oxides, d) from 0% to 60% by weight of one or more organic monomers, e) from 0% to 50% by weight of one or more plasticizers, and f) from 0% to 5% by weight of one or more additives selected from thermal and photochemical crosslinking initiators, sensitizers, wetting aids, adhesion promoters, leveling agents, antioxidants, stabilizers, dyes, photochromic compounds and thermochromic compounds.

The unmodified or surface-modified nanoscale particles may comprise one or more of $SiO_2$, $TiO_2$, $ZrO_2$ and $Ta_2O_5$ and/or the one or more organic monomers may comprise acrylate monomers such as, e.g., at least one of methyl methacrylate, a diol diacrylate and a diol methacrylate, and/or the organic polymer may comprise one or more of a polyacrylate, a polymethacrylate, a polyepoxide, a polyvinyl alcohol, a polyvinyl acetate and a polyvinyl butyral, and/or the one or more silanes may comprise at least one of methacryloyloxypropyltrimethoxysilane, acryloyloxypropyltrimethoxysilane, 3-glycidyloxypropyltrimethoxysilane, vinyltriethoxysilane, dimethyldimethoxysilane, dimethyldiethoxysilane and methyltriethoxysilane and/or the surface-modified nanoscale particles may comprise addition-polymerizable and/or polycondensable surface groups such as, e.g., one or more of (meth)acryloyl, allyl, vinyl, epoxy, hydroxyl, carboxyl and amino groups.

The present invention also provides a process for producing an optical element having a gradient structure, which process comprises (a) providing a solid or gel-like nanocomposite material comprising a curable matrix material and nanoscale particles dispersed in the matrix material or a liquid precursor of the nanocomposite material;

(b1) moulding the nanocomposite material or liquid precursor to form a moulding, or (b2) applying the nanocomposite material or liquid precursor to a substrate, (c) optionally, converting the liquid precursor into the solid or gel-like nanocomposite material, (d) generating a potential difference in the nanocomposite material to cause a directed diffusion of the nanoscale particles in the matrix material and a concentration gradient of the nanoscale particles in the matrix material; and (e) thermally and/or photochemically curing the nanocomposite material comprising the concentration gradient to form the optical element.

The present invention also provides an optical element with a gradient structure which is obtainable by any of the above processes, including the various aspects thereof.

In one aspect, this optical element may have an angle of view of above 10°. In another aspect, the optical element may comprise a hologram.

The present invention also provides a planar gradient index lens, a head-up display, a head-down display, an optical waveguide, and an optical data storage medium, all of which comprises the optical element of the present invention.

In accordance with the invention there is provided a process for producing optical elements with a gradient structure, especially for holographic applications, planar gradient index lenses in imaging optics, head-up displays, head-down displays, optical wave guides and optical data storage media, which comprise nanoscale particles embedded in a solid matrix, the gradient structure being formed by a concentration gradient of the nanoscale particles.

These optical elements are produced by generating a potential difference in a solid or gel-like nanocomposite material comprising a curable matrix material with nanoscale particles dispersed therein, so that there is directed diffusion of the nanoscale particles, with the formation of a concentration gradient, and the nanocomposite material comprising the concentration gradient cures.

The expression "curing", as used herein, includes addition polymerization, polycondensation, polyaddition and other crosslinking reactions. By the "concentration gradient" is meant a change in concentration of the nanoscale particles in one, two or three dimensions of the matrix material, which is different from a statistical distribution of the nanoscale particles and is, for example, linear, alternating or discontinuous and produces a one-, two- or three-dimensional pattern (e.g. for a hologram).

In accordance with the invention it has surprisingly been found that it is possible to bring about directed diffusion of nanoscale particles in a solid or gel-like matrix material, with the formation of a concentration gradient. This allows the materials to be handled more simply when producing optical elements.

It has been found that, by means of a potential difference of whatever kind, a directed diffusion (migration) of nanoscale particles in a solid or gel-like but still curable matrix material can be exploited for producing optical elements with a gradient structure if, after the concentration profile of the nanoscale particles has been formed, it is fixed by preferably thermal and/or photochemical curing in the matrix phase.

The potential difference as a driving force for the directed diffusion of the nanoscale particles in the matrix can be generated, for example, by way of an electrical field, as in the case of electrophoresis, by way of differences in the chemical potential (concentration of chemical substances or chemical groups) or in the interface potential.

If the potential difference is to be generated by way of an electrical field, a possible procedure is, for example, to bring the solid or gel-like, curable matrix material with, dispersed therein, nanoscale particles, which carry a surface charge, between two electrodes (anode and cathode) and so to cause the nanoscale particles to migrate in the direction of the electrode having a polarity which is opposite to their surface charge. The surface charge on the nanoscale particles can be formed, for example, by setting a pH which induces dissociation of groups present on the surface of the nanoscale particles (e.g. COOH to $COO^-$, metal-OH to metal-$O^-$).

It is preferred to generate a chemical potential difference, in analogy for example to the above-described Colburn-Haines effect, which is based on the following mechanism: in the case of a local (e.g. thermally and/or photochemically induced) addition polymerization or polycondensation of species having addition-polymerizable or polycondensable groups, such as carbon-carbon multiple bonds or epoxy rings, for example, addition polymerization or polycondensation leads to a depletion of addition-polymerizable or polycondensable groups in the regions in which the addition polymerization or polycondensation takes place. This leads to a diffusion of species with as yet unreacted addition-polymerizable or polycondensable groups into the (heated or illuminated) regions in which the addition polymerization or polycondensation has taken place, in order to compensate the chemical potential difference. This directed diffusion with subsequent curing leads to an increase in the density and hence to an increase in the refractive power in the heated or illuminated regions. When using nanoscale particles having addition polymerizable or polycondensable surface groups, therefore, it is possible to achieve a marked increase in the refractive power gradient by diffusion of the nanoscale particles, owing to the chemical potential difference between reacted and unreacted surface groups.

The expressions "addition polymerization" and "addition-polymerizable" used above also include polyaddition and groups capable of polyaddition.

The chemical potential difference is preferably generated by exposure to light or by electron beam radiation, in particular by holographic or lithographic techniques or by way of the mask aligner technique. By selective irradiation or exposure of the solid or gel-like nanocomposite material it is possible, for example, to initiate, locally and in a targeted manner, an addition polymerization or polycondensation which leads to a chemical potential difference which leads in turn to the directed diffusion of the nanoscale particles, with the formation of a concentration gradient.

For the exposure processes it is preferred to use UV light or laser light. When a laser is used as the light source it is possible, by way of holographic techniques, to produce not only periodic grid structures but also Fresnel structures. The intensity profiles which come about as a result of interference act as polymerization sinks. For the particularly preferred holographic exposure it is possible, for example, to produce phase-modulated volume holograms as transmission holograms or reflection holograms by means, for example, of two-wave mixing. As a coherent light source it is possible, for example, to employ an argon ion laser.

Generating a potential difference on the basis of different interface potentials is done preferably using nanoscale particles having hydrophobic surface groups which are embedded in a (more) hydrophilic matrix phase, the nanoscale particles with hydrophobic surface groups migrating to the (more) hydrophilic matrix phase/air interface. A preferred embodiment of this method using surface-modified nanoscale particles, which leads to the formation of a concentration gradient in the solid or gel-like matrix material, consists in making use of the incompatibility between the surface of the nanoscale particles and the matrix phase. If the nanoscale particles, for example, carry hydrophobic groups, such as fluorinated (alkyl) groups, on their surface, and the matrix material has a hydrophilic or less hydrophobic character, this may result in the hydrophobic particles migrating to the surface, thereby producing the lowest system energy. In general, this is the interface with the air, so that the hydrophobic or hydrophobically modified particles accumulate at the surface and become less concentrated, for example, at the interface with the substrate; after the coating has cured, this both ensures good adhesion between layer and substrate and produces a low-energy surface which is easy to clean.

In order to prevent separation of (hydrophilic) matrix material and hydrophobic nanoscale particles with this embodiment of the process of the invention from the outset, a possible procedure, for example, is to add to the matrix material a compatibilizer, which is later removed (e.g. by evaporation) or is incorporated stably into the matrix material in the course of curing.

The solid or gel-like nanocomposite material used in accordance with the invention, in which a directed diffusion of the nanoscale particles is induced by generating a potential difference, with formation of the concentration gradient, generally possesses a dynamic viscosity at 25° C. of from 2 to 1,000 Pas, preferably from 5 to 500 Pas and with particular preference from 10 to 100 Pas.

The matrix material in which the nanoscale particles are dispersed can in principle comprise any desired species which is suitable as a matrix material and can be converted into a solid or gel-like phase which is still curable. As matrix material it is possible in particular to use the materials described in WO 97/38333 for the production of the matrix phase, said publication being expressly incorporated by reference. The matrix material is preferably cured thermally and/or photochemically.

The matrix material may be an addition-polymerizable or polycondensable organic monomer, oligomer and/or prepolymer, an organic polymer and/or a condensate of one or more hydrolysable inorganic compounds which if desired has been organically modified. The matrix material preferably comprises at least one organic polymer and/or one condensate of one or more hydrolysable and condensable silanes.

The organic polymers that may be present in the matrix material may comprise any desired known plastics, examples being polyacrylic acid, polymethacrylic acid, polyacrylates, polymethacrylates, polyolefins, polystyrene, polyamides, polyimides, polyvinyl compounds, such as polyvinyl chloride, polyvinyl alcohol, polyvinyl butyral, polyvinyl acetate and corresponding copolymers, e.g. poly(ethylene-vinyl acetate), polyesters, e.g. polyethylene terephthalate or polydiallyl phthalate, polyarylates, polycarbonates, polyethers, e.g. polyoxymethylene, polyethylene oxide and polyphenylene oxide, polyether ketones, polysulphones, polyepoxides, fluoropolymers, e.g. polytetrafluoroethylene, and organopolysiloxanes. The polymers concerned are preferably transparent.

Particular preference is given to using organic polymers which are soluble in an organic solvent. Examples are polyacrylic acid, polymethacrylic acid, polyacrylates, polymethacrylates, polyepoxides, polyvinyl alcohol, polyvinyl acetate or polyvinyl butyral.

Suitable organic solvents include preferably alcohols, such as ethanol, isopropanol or butanol, ketones such as acetone, esters such as ethyl acetate, ethers such as tetrahydrofuran, and aliphatic, aromatic and halogenated hydrocarbons, such as hexane, benzene, toluene and chloroform. These solvents may be used for producing the matrix material.

If desired, an addition polymerizable or polycondensable monomer, oligomer or prepolymer which on thermally or photochemically induced addition polymerization or on (optionally acid- or base-catalysed) polycondensation produces one of the above-mentioned polymers, can be used for the matrix material. The oligomers and prepolymers are derived from the corresponding monomers.

Specific examples of polymerizable or polycondensable monomers are (meth)acrylic acid, (meth)acrylic esters, (meth)acrylonitrile, styrene and its derivatives, alkenes (e.g. ethylene, propylene, butene, isobutene), halogenated alkenes (e.g. tetrafluoroethylene, chlorotrifluoroethylene, vinyl chloride, vinyl fluoride, vinylidene fluoride, vinylidene chloride), vinyl acetate, vinylpyrrolidone, vinylcarbazole and mixtures thereof. Polyunsaturated monomers may also be present, examples being butadiene and (meth)acrylic esters of polyols (e.g. diols).

Preference is given to acrylates or methacrylates, especially methyl methacrylate, a diol (meth)acrylate or a diol di(meth)acrylate, such as hexanediol dimethacrylate, hexanediol diacrylate, dodecanediol dimethacrylate and dodecanediol diacrylate, for example.

In addition to or instead of the said organic materials the matrix material may also comprise a condensate of inorganic or organically modified inorganic hydrolysable compounds. These may, for example, be hydrolysable and condensable compounds of Si, Al, B, Pb, Sn, Ti, Zr, V and Zn, particularly those of Si, Al, Ti and Zr or mixtures thereof.

Particularly preferred matrix materials are polycondensates of one or more hydrolysable and condensable silanes, with at least one silane having, where appropriate, a non-hydrolysable radical which is addition-polymerizable or polycondensable. Particular preference is given to using one or more silanes having the following general formulae (I) and/or (II):

in which the radicals X are identical or different and are hydrolysable groups or hydroxyl groups;

in which each R is identical or different and is a non-hydrolysable radical which if desired carries an addition-polymerizable or polycondensable group, X is as defined above and a has the value 1, 2 or 3, preferably 1 or 2.

In the above formulae, the hydrolysable groups X are, for example, hydrogen or halogen (F, Cl, Br or I), alkoxy (preferably $C_{1-6}$-alkoxy, such as methoxy, ethoxy, n-propoxy, i-propoxy and butoxy), aryloxy (preferably $C_{6-10}$-aryloxy, such as phenoxy), acyloxy (preferably $C_{1-6}$-acyloxy, such as acetoxy or propionyloxy), alkylcarbonyl (preferably $C_{2-7}$-alkylcarbonyl, such as acetyl), amino, monoalkylamino or dialkylamino having preferably 1 to 12, especially 1 to 6 carbon atoms in the alkyl group or groups.

The non-hydrolysable radical R is, for example, alkyl (preferably $C_{1-6}$-alkyl, such as methyl, ethyl, n-propyl, iso-propyl, n-butyl, s-butyl and t-butyl, pentyl, hexyl or cyclohexyl), alkenyl (preferably $C_{2-6}$-alkenyl, such as vinyl, 1-propenyl, 2-propenyl and butenyl), alkynyl (preferably $C_{2-6}$-alkynyl, such as acetylenyl and propargyl) and aryl (preferably $C_{6-10}$-aryl, such as phenyl and naphthyl). These radicals R and X can optionlly carry one or more customary substituents, such as halogen, ether, phosphoric acid, sulphonic acid, cyano, amido, mercapto, thioether or alkoxy groups, as functional groups.

The radical R may contain an addition-polymerizable or polycondensable group. This also includes the above alkenyl and alkynyl groups. Specific examples of the addition-polymerizable or polycondensable groups of the radical R are epoxy, hydroxyl, amino, monoalkylamino, dialkylamino, carboxyl, allyl, vinyl, acryloyl, acryloyloxy, methacryloyl, methacryloyloxy, cyano, aldehyde and alkylcarbonyl groups. These groups are attached to the silicon atom preferably by way of alkylene, alkenylene or arylene bridge groups, which may be interrupted by oxygen or sulphur atoms or by —NH— groups. These bridge groups are derived, for example, from the abovementioned alkyl, alkenyl or aryl radicals. The bridge groups of the radicals R contain preferably 1 to 18, especially 1 to 8 carbon atoms.

Particularly preferred hydrolysable silanes of the general formula (I) are tetraalkoxysilanes, such as tetraethoxysilane (TEOS) and tetramethoxysilane. Particularly preferred organosilanes of the general formula (II) are epoxysilanes, such as 3-glycidyloxypropyltrimethoxysilane (GPTS), and silanes which have reactive addition-polymerizable double bonds, such as vinyltriethoxysilane, methacryloyloxypropyltrimethoxysilane and acryloyloxypropyltrimethoxysilane. Further silanes whose use is preferred are dimethyldimethoxysilane, dimethyldiethoxysilane or methyltriethoxysilane. Preference is given to using combinations of silanes having a non-hydrolysable radical with an addition-polymerizable or polycondensable group and a further silane which contains no addition-polymerizable or polycondensable group.

It is of course also possible to use one or more silanes which have 1 or 2 non-hydrolysable radicals without addition-polymerizable or polycondensable groups and 1 or 2 non-hydrolysable radicals with addition-polymerizable or polycondensable groups, there being in total not more than 3 non-hydrolysable radicals attached to the Si.

It is preferred to use at least one silane which has a non-hydrolysable radical containing an addition-polymerizable or polycondensable group. By way of these groups it is possible, where appropriate together with addition-polymerizable or polycondensable organic monomers, oligomers and/or prepolymers which are likewise employed, for an addition polymerization or polycondensation, or crosslinking of the matrix material, to take place. Moreover, these addition-polymerizable or polycondensable groups of the radical R can also react with reactive groups present on the surface of the nanoscale particles and so contribute to the immobilization of the nanoscale particles (by binding them into a network, for example).

In order to distinguish it from the inorganic degree of condensation, which results through hydrolysis and condensation of the hydrolysable inorganic compounds, with the formation of Si—O—Si bridges, for example, the extent of linkage by way of the addition-polymerizable or polycondensable groups of the non-hydrolysable radicals of the hydrolysable compounds is referred to below as organic degree of addition polymerization or polycondensation.

The hydrolysis and polycondensation of the above compounds are carried out in a conventional manner, if desired in the presence of a solvent and of an acidic or basic condensation catalyst such as HCl, $HNO_3$ or $NH_3$. For instance, hydrolysis and polycondensation can take place, for example, under the (widely known) conditions of the sol-gel process. For producing the solid or gel-like but still curable matrix material it is preferred to carry out hydrolysis with a substoichiometric amount of water, for example with from 0.3 to 0.9 times the stoichiometric amount. Condensation takes place preferably at a temperature of from 5 to 40° C.

The solid or gel-like but still curable matrix material preferably comprises a condensate having an inorganic degree of condensation of from 33 to 100% and an organic degree of addition polymerization or polycondensation from 0 to 95%. An inorganic degree of condensation of 33% means, for example, that on average one out of three hydrolysable radicals has undergone condensation to form an inorganic bridge such as Si—O—Si. The organic degree of addition polymerization or polycondensation indicates how many addition-polymerizable or polycondensable groups in the non-hydrolysable radicals have undergone an addition polymerization or polycondensation reaction: an organic degree of addition polymerization or polycondensation of 95% means, for example, that 95% of all addition-polymerizable or polycondensable groups in the non-hydrolysable radicals have been addition-polymerized or polycondensed.

Where the addition-polymerizable or polycondensable group contains an olefinic double bond, the conversion can also be observed by IR spectroscopy. In the case of epoxide groups, for example, polycondensation can be brought about by acidic or basic catalysis. Groups containing olefinic double bonds can be addition-polymerized, for example, by means of UV exposure.

The nanoscale particles which can be employed in the process of the invention preferably have a diameter of not more than 100 nm, especially not more than 50 nm, and with particular preference not more than 20 nm. As far as the lower limit is concerned there are no particular restrictions, although this lower limit is for practical reasons generally 0.5 nm, in particular 1 nm and more frequently 4 nm. The refractive index depends on the nature of the particles and is known to the person skilled in the art.

The nanoscale particles are, in particular, inorganic particles and comprise, for example, oxides, such as ZnO, CdO, $SiO_2$, $TiO_2$, $ZrO_2$, $CeO_2$, $SnO_2$, $Al_2O_3$, $In_2O_3$, $La_2O_3$, $Fe_2O_3$, $Ta_2O_5$, $Cu_2O$, $V_2O_5$, $MoO_3$ or $WO_3$; chalcogenides, examples being sulphides such as CdS, ZnS, PbS or $Ag_2S$; selenides, such as GaSe, CdSe or ZnSe; and tellurides, such as ZnTe or CdTe; halides, such as AgCl, AgBr, AgI, CuCl, CuBr, $CdI_2$ or $PbI_2$; carbides, such as $CdC_2$ or SiC; arsenides, such as AlAs, GaAs or GeAs; antimonides, such as InSb; nitrides, such as BN, AlN, $Si_3N_4$ or $Ti_3N_4$; phosphides, such as GaP, InP, $Zn_3P_2$ or $Cd_3P_2$; phosphates; silicates; zirconates; aluminates; stannates; and corresponding mixed oxides, for example those with the perovskite structure, such as $BaTiO_3$ or $PbTiO_3$.

These nanoscale particles can be prepared by conventional means: for example, by flame pyrolysis, plasma methods, colloid techniques, sol-gel processes, controlled nucleation and growth processes, MOCVD methods and emulsion methods. The nanoscale particles can also be prepared in situ in the presence of the still liquid matrix material (or parts thereof) using, for example, sol-gel processes. These methods are described in detail in the literature.

It is preferred to use surface-modified nanoscale particles. The optional modification of the surface of the nanoscale particles with suitable functional groups (e.g. addition-polymerizable or hydrophobic groups) is also known, for example from DE-A-19719948 or DE-A-19746885 and EP-B-636111.

Surface-modified nanoscale particles may be prepared in principle by two different methods: firstly, by surface modification of pre-prepared nanoscale inorganic particulate solids, and secondly by preparing these inorganic nanoscale particulate solids using one or more compounds suitable for surface modification. Compounds suitable for surface modification directly during preparation of the particles include all those compounds specified below for a subsequent surface modification.

Where surface modification of pre-prepared nanoscale particles is carried out, compounds suitable for this purpose include all compounds (preferably having a molecular weight of below 300 and in particular below 200) which possess one or more groups which are able to react or at least interact with (functional) groups (such as OH groups in the case of oxides, for example) present on the surface of the nanoscale particulate solids. Preference is given to the formation of covalent and/or coordinative bonds. Specific examples of organic compounds which can be utilized for surface modification of the nanoscale inorganic particulate solids are, for example, saturated or unsaturated carboxylic acids, such as (meth) acrylic acid, β-dicarbonyl compounds (e.g. saturated or unsaturated β-diketones or β-carbonylcarboxylic acids), alcohols, amines, epoxides and the like.

With particular preference in accordance with the invention the surface modification is carried out using hydrolytically condensable silanes having at least (and preferably) one non-hydrolysable radical. Examples of silanes suitable for this purpose are the abovementioned hydrolysable silanes of the formula (II), preferably those containing a (meth)acryloyl group. Particular preference is given in accordance with the invention to using surface-modified particles which have an addition-polymerizable or polycondensable group on the surface. With particular preference these groups are (meth)acryloyl, allyl, vinyl, epoxy, hydroxyl, carboxyl or amino groups.

The nanocomposite material may also comprise additives customary for optical systems. Examples of plasticizers, thermal or photochemical crosslinking initiators, sensitizers, wetting assistants, adhesion promoters, leveling agents, antioxidants, stabilizers, dyes and photochromic or thermochromic compounds.

The nanocomposite material, in particular a still liquid precursor for preparing the solid or gel-like nanocomposite material, may also, prior to curing, comprise one or more solvents. The solid or gel-like nanocomposite material may appropriately include a residual solvent fraction of from 0 to 15% by weight, in particular from 2 to 12% by weight. Examples of solvents which can be used have been listed above. Another solvent is water. If an organic polymer is used it is preferred to employ a solvent in which this polymer is soluble.

As plasticizers it is possible, for example, to use compounds which have elasticizing or plasticizing properties in accordance with DIN 55945 (December 1988). These compounds are preferably esters. Particular preference is given to plasticizers selected from the group consisting of acyclic dicarboxylic esters, e.g. esters of adipic acid such as di-n-octyl adipate, bis(2-ethylhexyl) adipate, diisodecyl adipate, dibutyl sebacate, dioctyl sebacate and bis(2-ethyl-hexyl) sebacate; esters of $C_6$-$C_{12}$ dicarboxylic acids with polyalkylene glycols, e.g. triethylene glycol bis(n-heptanoate), triethylene glycol bis(2-ethylhexanoate), triethylene glycol bis (isononanoate); esters of $C_6$-$C_{12}$ carboxylic acids with polyalkylene glycols, e.g. triethylene glycol bis(2-ethylhexylbutyrate); diesters of (meth)acrylic acid and polyalkylene glycols, such as polypropylene glycol diacrylate or dimethacrylate, polyethylene glycol diacrylate or dimethacrylate, for example tetraethylene glycol di(meth) acrylate.

Suitable catalysts/initiators or crosslinking initiators include all customary initiators/initiating systems which are known to the person skilled in the art, including free-radical photoinitiators, free-radical thermoinitiators, cationic photoinitiators, cationic thermoinitiators, and any desired combinations thereof. Under certain circumstances it is possible to do without the crosslinking initiator entirely, such as in the case, for example, where appropriate, of electron beam curing or laser curing.

Specific examples of free-radical photoinitiators which can be used are Irgacure® 184 (1-hydroxycyclohexyl phenyl ketone), Irgacure® 500 (1-hydroxycyclohexyl phenyl ketone, benzophenone) and other photoinitiators of the Irgacure® type obtainable from Ciba-Geigy; Darocur® 1173, 1116, 1398, 1174 and 1020 (obtainable from Merck), benzophenone, 2-chlorothioxanthone, 2-methylthioxanthone, 2-isopropylthioxanthone, benzoin, 4,4'-dimethoxybenzoin, benzoin ethyl ether, benzoin isopropyl ether, benzil dimethyl ketal, 1,1,1-trichloroacetophenone, diethoxyacetophenone and dibenzosuberone.

Examples of free-radical thermoinitiators are preferably organic peroxides in the form of diacyl peroxides, peroxydicarbonates, alkyl peresters, alkyl peroxides, dialkyl peroxides, perketals, ketone peroxides and alkyl hydroperoxide, and also azo compounds. Specific examples that could be mentioned here include in particular dibenzoyl peroxide, tert-butyl perbenzoate and azobisisobutyronitrile. An example of a cationic photoinitiator is Cyracure® UVI-6974, while a preferred cationic thermoinitiator is 1-methylimidazole.

Catalysts which induce polycondensation are, for example, Brönsted acids and bases, such as mineral acids or tertiary amines, for anionic polycondensation, and Lewis acids, such as metal alkoxides (e.g. aluminium alkoxides in the case of epoxysilanes), for cationic polycondensation. Where there is participation of epoxide groups (for example in the curing of the matrix phase), it is particularly advantageous to add ring-opening catalysts such as, for example, N-alkylimidazoles.

Examples of leveling agents are polyether-modified dimethylpolysiloxanes such as Byk® 306. Examples of sensitizers are amine-modified oligoether acrylates such as Crodamers®.

The solid or gel-like nanocomposite material preferably comprises, based on the total dry weight of the nanocomposite material, from 4.9 to 95.9% by weight of organic polymer, from 4 to 95% by weight of an unmodified or organically modified inorganic condensate of hydrolysable and condensable compounds, and from 0.1 to 50% by weight, more frequently from 1 to 50% by weight and preferably from 5 to 30% by weight of nanoscale particles. The solid or gel-like nanocomposite material may further contain, based on the total dry weight of the nanocomposite material, from 0 to 60% by weight of an organic monomer, oligomer or prepolymer, from 0 to 50% by weight, preferably from 0.1 to 30% by weight of a plasticizer and from 0 to 5% by weight of additional additives.

The components for producing the nanocomposite material may be mixed with one another in any way and any order. To produce the solid or gel-like nanocomposite material it is preferred first to prepare a liquid precursor which comprises the matrix material or a precursor thereof and the nanoscale particles dispersed therein. An example of the procedure here is either (a) to disperse the pre-prepared nanoscale particles in a solution comprising the matrix-forming component(s) and then to remove at least part of any solvent,
(b) to generate the matrix material in the presence of the nanoscale particles, or
(c) to generate the nanoscale particles in the presence of the matrix material.

Where the matrix material comprises the condensate of hydrolysable compounds, whose use is preferred, this condensate is prepared as described above by hydro-lysing and condensing the hydrolysable compounds and, where appropriate, addition-polymerizing and polycondensing addition-polymerizable or polycondensable groups that are present on non-hydrolysable radicals. Any organic polymer and/or organic monomer, oligomer or prepolymer used additionally, which may likewise be at least partly addition-polymerized or polycondensed, are added subsequently or in the course of the hydrolysis and condensation, the organic polymer in particular preferably being in solution in an organic solvent. Naturally, the inorganic matrix components may also be added conversely to the organic matrix components.

The nanoscale particles and any additives may be added in at any desired point in time, the addition of the nanoscale particles being able to take place in accordance with one of the above variants (a), (b) or (c). The nanoscale particles may be mixed in the form, for example, of a suspension in a solvent, which appropriately is compatible with the solvent of the organic polymer, with the matrix components (for example, condensate or precondensate and organic polymer) (variants (a), (b)). The nanoparticles may also be prepared in situ by hydrolysis and condensation of corresponding precursors in a part-condensed precondensate of the hydrolysable compounds and/or in the dissolved organic polymer.

The preferred product is a still liquid precursor of the nanocomposite material in which the nanoscale particles are dispersed in the liquid matrix phase. The inorganic degree of condensation and the organic degree of addition-polymerization or polycondensation of the condensate in the liquid precursor may correspond to or be situated below those in the solid or gel-like nanocomposite material. The solidification or gelling of the nanocomposite material may take place, for example, by evaporation of solvent, appropriately to a residual fraction of from 0 to 15% by weight, in particular from 2 to 12% by weight, and/or by increasing the inorganic degree of condensation and/or of the organic degree of addition polymerization or polycondensation.

The solid or gel-like but still curable nanocomposite material or a liquid precursor thereof is then preferably converted into the structure necessary for the intended optical element. This can be done, for example, by introducing the nanocomposite material into a mould, in order to produce a moulding, applying the nanocomposite material to a substrate, to form a coating, or forming a composite system of two or more components of which at least one is composed of the nanocomposite material. It will be appreciated that for such structuring a liquid precursor of the nanocomposite material is usually more appropriate. After the moulding, coating or assembly of the intended optical element, the nanocomposite material is then converted into the solid or gel-like nanocomposite material.

To produce mouldings, the liquid precursor can be poured, for example, into suitable moulds and then converted into the solid or gel-like form.

For coating it is preferred to select substrates suitable for optical applications, such as glass, ceramic, silicon, metal, semiconductor materials or (preferably transparent) plastics, such as PET, PE and PP, for example. One particularly preferred substrate is a polymer film. Coating may take place by customary methods, for example by dipping, flow coating, knife coating, pouring, spin coating, spraying, brushing, slot coating, meniscus coating, film casting, spinning or spraying. Liquid precursors of the nanocomposite material are naturally suitable for this purpose, the required viscosity being settable by adding or removing solvent. Preferred coat thicknesses (in the cured state) are from 0.2 to 100 µm. Thereafter it is normal to evaporate at least some of the solvent in order to convert the nanocomposite material into the solid or gel-like form.

In one preferred embodiment the nanocomposite material is applied to a transparent polymer film and converted into the solid or gel-like form, which appropriately has a residual solvent content of not more than 15% by weight, and then a second polymer film is laminated on, as a protective film. In this form the film material can be stored in wound, light-protected and climatized (15 to 30° C.) form. In this way it is also possible to produce a film assembly or film composite. Films having a coating which has a refractive index gradient, onto which a second film may have been laminated (film composite), are preferred optical elements according to the invention.

Subsequently, in the solid or gel-like nanocomposite material, a potential difference is generated in the manner described above, so that by directed diffusion of the nanoscale particles a concentration gradient is formed. The potential difference is preferably generated by an exposure process. The events which unfold when a potential difference is being generated are elucidated below for a preferred embodiment.

By a relatively intense local exposure, nanoparticles with addition-polymerizable groups crosslink with one another and/or with addition-polymerizable groups from the part-condensed silane component of the solid or gelled matrix, so that a chemical potential gradient for nanoparticles with addition-polymerizable groups on their surface to an unexposed adjacent region is formed. From this adjacent region, further nanoparticles diffuse into the exposed region. This process may take place during and after exposure and lasts for between a few seconds and a few minutes, depending on exposure conditions and temperature. As a result of the difference in refractive index between the nanoparticles and the matrix, a local refractive index gradient is formed in this way.

Following the setting of the condensation gradient of the nanoscale particles, brought about by means of a potential difference, the nanocomposite material is cured, i.e. fully addition-polymerized and/or polycondensed (crosslinked). In the course of this procedure, any solvent present is removed. Depending on the nature of the crosslinking initiators (where used) and on the nature of the components employed for the matrix phase, curing may take place thermally and/or by irradiation (with a UV emitter or laser, for example). The curing conditions (temperature, UV wavelength, etc.) depend in the case of the addition polymerization of unsaturated groups on the decomposition conditions of the polymerization initiator. Thermal curing usually takes place at temperatures below 150° C. If only inorganic components are involved in the curing of the matrix phase, the hydrolysis and condensation can also be carried out at higher temperatures (e.g. up to 500° C.). Curing fixes the concentration gradient.

The process of the invention is particularly suitable for producing optical elements having a refractive index gradient. The optical elements are suitable in particular for holographic applications, as planar gradient index lenses in imaging optics, head-up displays, head-down displays, optical waveguides, especially in optical communications and transmission technology, and optical data storage media. Examples of optical elements which can be produced are security holograms, picture holograms, digital holograms for information storage, systems comprising components which process light wavefronts, planar waveguides, beam splitters and lenses.

DETAILED DESCRIPTION OF THE INVENTION

In the examples below, the angle of view is determined as a measure of the refractive index modulation that has been achieved. In this case the luminescence of a nanocomposite material applied to a substrate is measured with a luminescence meter (60° to the central axis) after particle migration and full curing of the matrix (freezing-in of the refractive index gradient) in 1° steps (angle α −30° to +30°). The angle of view corresponds to the mid-peak width I/2 of a plot of the intensity I [%] against the angle α. The higher the angle of view, the higher the scattering power of the material. The aim is for values above 10°.

EXAMPLE 1 a) Preparation of $Zr(OPr)_4$/MAA (1:1):

A 250 ml three-necked flask is charged with 65.4 g (0.02 mol) of zirconium tetrapropoxide $Zr(OPr)_4$ and cooled in an ice bath. 17.2 g (0.20 mol) of methacrylic acid (MAA) are added slowly (15 min) dropwise thereto with stirring. Following complete addition, the reaction mixture is removed from the ice bath after 10 minutes and then stirred at 25° C.

b) Preparation of a Silane-PVB Mixture:

49.6 g (0.20 mol) of methacryloyloxypropyltrimethoxysilane (MPTS) are admixed with 24 g (0.20 mol) of dimethyldimethoxysilane (DMDS) and the mixture is stirred at 25° C. for 5 minutes. Following the addition of 9.05 g of 0.1 N HCl stirring is continued at 25° C. for 10 minutes until the reaction mixture becomes clear. Then 49.92 g of polyvinylbutyral (PVB) (30% strength by weight solution in 2-propanol) are added and the mixture is stirred at 25° C. for 5 minutes.

c) Preparation of the Matrix:

22.27 g of the $Zr(OPr)_4$/MAA nanoparticles prepared in a) are added slowly with stirring to the mixture b). Complete addition is followed by stirring at 25° C. for 4 hours and dropwise addition of 1.08 g (0.06 mol) of water. After overnight stirring at 25° C., 6.2 g of dodecanediol dimethacrylate (DDDMA) and 1.6 g of the photoinitiator Irgacure® 184 are added.

EXAMPLES 2 to 4 a) $Zr(OPr)_4$/MAA (1:1) is prepared as in Example 1.

b) A second vessel is charged with MPTS; the desired amounts of DMDES, PVB solution (30% strength by weight in ethanol) and triethylene glycol di(2-ethylhexanoate) are added thereto in accordance with Table 1, and the mixture is stirred at 25° C. for 15 minutes. Then 0.1 N HCl is added and the reaction mixture, which is cloudy to start with, is stirred at room temperature for about 10 minutes until it becomes clear. Thereafter $Zr(OPr)_4$/MAA is added slowly, with a dropping funnel, with stirring. Following complete addition, the mixture is stirred at room temperature for 4 hours. The required amount of water is then added dropwise and the mixture is stirred at room temperature overnight.

c) Then Crodamer® UVA 421 is added. After a further 15 minutes, Irgacure® 819 is added. The batch is then diluted with isopropanol and a leveling agent (Byk® 306) is added. Stirring is continued until mixing is complete.

TABLE 1

|  | Example 1 | | Example 2 | | Example 3 | |
| --- | --- | --- | --- | --- | --- | --- |
| MPTS | 18.6 g | 0.075 mol | 24.8 g | 0.1 mol | 31.0 g | 0.125 mol |
| PVB solution | 133.6 g | | 133.6 g | | 133.6 g | |
| TEG di(2-ethyl-hexanoate) | 105.1 g | | 110.6 g | | 116.1 g | |
| DMDES | 11.1 g | 0.075 mol | 14.8 g | 0.1 mol | 18.5 g | 0.125 mol |
| 0.1 N HCl | 3.375 g | 0.1875 mol | 4.50 g | 0.25 mol | 5.6 g | 0.3125 mol |
| Zr $(O^nPr)_4$/(MAA) | 41.6 g | | 41.6 g | | 41.6 g | |
| $H_2O$ | 1.9 g | 0.11 mol | 1.9 g | 0.11 mol | 1.9 g | 0.11 mol |
| Crodamer UVA 421 | 6.41 g | | 6.75 g | | 7.08 g | |
| Irgacure 819 | 6.41 g | | 6.75 g | | 7.08 g | |
| Byk 306 | 6.15 g | | 6.5 g | | 6.8 g | |
| Isopropanol | 82.0 g | | 86.3 g | | 90.6 g | |
| Angle of view | 12° | | 12° | | 12° | |

TEG = triethylene glycol
DMDES = dimethyldiethoxysilane

EXAMPLES 5 to 14 a) $Zr(OPr)_4/MAA$ (1:1) is prepared as in Example 1.

b) A second vessel is charged with MPTS. The desired amounts of DMDES, PVB solution (30% strength by weight in ethanol) and isopropanol are added thereto, and the mixture is stirred at 25° C. for 15 minutes. Then 0.1 N HCl is added and the reaction mixture, which is cloudy to start with, is stirred at room temperature for about 10 minutes until it becomes clear. Thereafter the desired amount of $Zr(OPr)_4/MAA$ is added slowly, with a dropping funnel, with stirring. Following complete addition, the mixture is stirred at room temperature for 4 hours. The required amount of water is then added dropwise and the mixture is stirred at room temperature overnight.

Then Irgacure® 819 and Byk® 306 are added. Stirring is carried out until mixing is complete (base varnish). Then the plasticizers and sensitizers are added as per Table 2.

| Base varnish | | |
|---|---|---|
| MPTS | 139 g | 0.56 mol |
| PVB solution | 601.2 g | |
| Isopropanol | 365.7 g | |
| DMDES | 82.9 g | 0.56 mol |
| 0.1 N HCl | 25.2 g | 1.41 mol |
| $Zr(O^nPr)_4/(MAA)$ | 187.2 g | |
| 8.46 g | 8.46 g | 0.47 mol |
| Irgacure 819 | 15.8 g | |
| Byk 306 | 23.7 g | |

PVB: Mowital ® 30 HH and 650 HH (1:1)

TABLE 2

Variation of the plasticizers and sensitizers
(variation per 100 g batch)

| Example | Crodamer UVA 421 | Polyalkylene glycol acrylate | TEG di(2-ethyl-hexanoate) | Angle of view |
|---|---|---|---|---|
| 5 | 0.7776 g | — | 3.1104 g | 16° |
| 6 | 1.1664 g | — | 3.1104 g | 16° |
| 7 | 1.5552 g | — | 1.5552 g | 12° |
| 8 | 0.7776 g | 2.3328 g PPGDMA (570) | — | 12° |
| 9 | 0.7776 g | 1.5552 g PEGDMA (330) | — | 13° |
| 10 | 0.7776 g | 1.5552 g PEGDMA (330) | 0.7776 g | 13° |
| 11 | 0.7776 g | 2.3328 g PPGDA (540) | — | 10° |
| 12 | 0.7776 g | 1.5552 g PEGDA (258) | 0.7776 g | 13° |
| 13 | — | 1.5552 g PEGDMA (330) | 1.5552 g | 14° |
| 14 | — | 0.7776 g PEGDMA (330) | 2.3328 g | 16° |

PPGDMA (570): polypropylene glycol dimethacrylate (average molar weight: 570 g/mol)
PEGDMA (330): polyethylene glycol dimethacrylate (average molar weight: 330 g/mol)
PPGDA (540): polypropylene glycol diacrylate (average molar weight: 540 g/mol)
PEGDA (258): polyethylene glycol diacrylate (average molar weight: 258 g/mol)

EXAMPLE 15

A 2 l three-necked flask is charged with 592.2 g (1.81 mol) of $(Zr(OPr)_4$ and cooled to 10° C. in an ice bath. 155.7 g (1.81 mol.) of MAA are added slowly dropwise thereto with stirring. Following complete addition the reaction mixture is removed from the ice bath after 10 minutes and then stirred at 25° C.

A 10 l reactor is charged with 2312.1 g of PVB (30% strength by weight in 2-propanol). Thereafter first 2241.9 g (9.04 mol) of MPTS and then 1338 g (9.04 mol) of dimethyldiethoxysilane (DMDES) are added slowly and the mixture is homogenized at 25° C. for 45 minutes. Subsequently 407 g of 0.1 N HCl are added. The temperature in the reactor is kept constant at 40° C. by thermostat. After the reaction mixture has clarified, 748 g of the above-prepared $Zr(OPr)_4/MAA$ are added dropwise with vigorous stirring at 40° C. Following complete addition the reaction mixture is stirred at 25° C. for 4 hours. Thereafter 48.78 g (2.71 mol) of water are added and stirring is continued at 25° C. for 16 hours. Then 260 g of hexanediol dimethacrylate (HDDMA) are added, followed after 30 minutes of stirring at 25° C. by 99 g of Crodamer® UVA 421. After a further 30 minutes of stirring at 25° C., 99.5 g of Irgacure® 819 are added.

EXAMPLE 16

By means of two-wave mixing, phase-modulated volume holograms are generated, both as transmission holograms and as reflection holograms. The coherent light source used is an argon ion laser. The laser beam (20 mW/cm$^2$) is focused to a diameter of approximately 0.5 mm and divided by a beam splitter into two component beams of equal intensity. The interference of these two beams leads to a spatially periodic change in the light intensity. The holographic material used is the photo-nanocomposite material from Example 1. For layer production, the photonanocomposite material is laminated onto a glass substrate (10 cm×10 cm×0.25 cm), covered with a polyester film and exposed with these intensity modulations. A grid structure is formed whose periodicity is the same as that of the intensity modulation. The refractive index profile is frozen in by screening off one of the write beams used in the experiment in order to use the remaining beam for postpolymerization. In this way, volume holograms having a diffraction efficiency of 90% (wavelength: 633 nm) are produced.

What is claimed is:

1. A process for producing an optical element having a gradient structure, which process comprises
   (a) providing a solid or gel nanocomposite material comprising a curable matrix material and nanoscale particles dispersed in the matrix material;
   (b) generating a potential difference in the solid or gel nanocomposite material to cause a directed diffusion of the nanoscale particles in the matrix material and a concentration gradient of the nanoscale particles in the matrix material; and
   (c) curing the solid or gel nanocomposite material comprising the concentration gradient to form the optical element.

2. The process of claim 1, wherein (b) comprises subjecting the solid or gel nanocomposite material to an electrical field.

3. The process of claim 1, wherein (b) comprises generating a difference in an interface potential in the solid or gel nanocomposite material.

4. The process of claim 1, wherein (b) comprises generating a difference in a chemical potential in the solid or gel nanocomposite material.

5. The process of claim 4, wherein generating the difference in the chemical potential comprises exposing the solid or gel nanocomposite material to light.

6. The process of claim 5, wherein the light comprises at least one of UV light and laser light.

7. The process of claim 4, wherein generating the difference in the chemical potential comprises irradiating the solid or gel nanocomposite material with an electron beam.

8. The process of claim 4, wherein the difference in the chemical potential is generated by at least one of a holographic and a lithographic technique.

9. The process of claim 1, wherein (c) comprises a thermal curing of the solid or gel nanocomposite material.

10. The process of claim 1, wherein (c) comprises a photochemical curing of the solid or gel nanocomposite material.

11. The process of claim 1, wherein the solid or gel nanocomposite material has a dynamic viscosity at 25° C. of from 2 to 1,000 Pas.

12. The process of claim 11, wherein the dynamic viscosity is from 5 to 500 Pas.

13. The process of claim 11, wherein the dynamic viscosity is from 10 to 100 Pas.

14. The process of claim 12, wherein the curable matrix material comprises at least one of an organic polymer and a condensate based on one or more hydrolysable and condensable silanes.

15. The process of claim 1, wherein the curable matrix material comprises a material prepared from one or more of a monomer, an oligomer and a prepolymer which is at least one of addition-polymerizable and poly-condensable.

16. The process of claim 1, wherein the curable matrix material comprises a material prepared from one or more of hydrolysable silanes of at least one of general formulae (I) and (II) and of precondensates derived from these silanes:

$$SiX_4 \quad (I)$$

wherein the radicals X independently represent hydrolysable groups or hydroxyl groups;

$$R_a SiX_{(4-a)} \quad (II)$$

wherein each radical R independently represents a non-hydrolysable radical which optionally carries an addition-polymerizable or polycondensable group, X is as defined above and a represents 1, 2 or 3.

17. The process of claim 1, wherein the nanoscale particles have a diameter of not more than 100 nm.

18. The process of claim 11, wherein the nanoscale particles have a diameter of not more than 50 nm.

19. The process of claim 12, wherein the nanoscale particles have a diameter of not more than 20 nm.

20. The process of claim 1, wherein the nanoscale particles comprise inorganic particles.

21. The process of claim 1, wherein the solid or gel nanocomposite material comprises from 0.1% to 50% by weight of nanoscale particles.

22. The process of claim 17, wherein the solid or gel nanocomposite material comprises from 1% to 50% by weight of nanoscale particles.

23. The process of claim 18, wherein the solid or gel nanocomposite material comprises from 5% to 30% by weight of nanoscale particles.

24. The process of claim 1, wherein the solid or gel nanocomposite material comprises, based on the total dry weight thereof:
   a) from 4.9% to 95.9% by weight of at least one organic polymer,
   b) from 4% to 95% by weight of a condensate of one or more hydrolysable and condensable silanes, with at least one silane having, optionally, a non-hydrolysable radical which is addition-polymerizable or polycondensable, the inorganic degree of condensation being from 33% to 100% and the organic degree of addition polymerization or polycondensation being from 0% to 95%,
   c) from 0.1% to 50% by weight of one or more kinds of unmodified or surface-modified nanoscale particles selected from oxides, sulphides, selenides, tellurides, halides, carbides, arsenides, antimonides, nitrides, phosphides, carbonates, carboxylates, phos-phates, sulphates, silicates, titanates, zirconates, stannates, plumbates, aluminates and corresponding mixed oxides,
   d) from 0% to 60% by weight of one or more organic monomers,
   e) from 0% to 50% by weight of one or more plasticizers, and
   f) from 0% to 5% by weight of one or more additives selected from thermal and photochemical crosslinking initiators, sensitizers, wetting aids, adhesion promoters, leveling agents, antioxidants, stabilizers, dyes, photochromic compounds and thermochromic compounds.

25. The process of claim 24, wherein the unmodified or surface-modified nanoscale particles comprise at least one of $SiO_2$, $TiO_2$, $ZrO_2$ and $Ta2O_5$.

26. The process of claim 24, wherein the one or more organic monomers comprise acrylate monomers.

27. The process of claim 26, wherein the acrylate monomers comprise at least one of methyl methacrylate, a diol diacrylate and a diol methacrylate.

28. The process of claim 24, wherein the organic polymer comprises at least one of a polyacrylate, a polymethacrylate, a polyepoxide, a polyvinyl alcohol, a polyvinyl acetate and a polyvinyl butyral.

29. The process of claim 24, wherein the one or more silanes comprise at least one of methacryloyloxypropyl-trimethoxysilane, acryloyloxypropyltrimethoxysilane, 3-glycidyloxypropyltrimethoxysilane,vinyltriethoxysilane, dimethyldimethoxysilane, dimethyldiethoxysilane and methyltriethoxysilane.

30. The process of claim 24, wherein the surface-modified nano scale particles comprise at least one of addition-polymerizable and polycondensable surface groups.

31. The process of claim 30, wherein the surface groups comprise one or more of (meth)acryloyl, allyl, vinyl, epoxy, hydroxyl, carboxyl and amino groups.

32. A process for producing an optical element having a gradient structure, which process comprises
   (a) providing a solid or gel nanocomposite material comprising a curable matrix material and nanoscale particles dispersed in the matrix material or a liquid precursor of the nanocomposite material;
   (b1) moulding the nanocomposite material or liquid precursor to form a moulding, or
   (b2) applying the nanocomposite material or liquid precursor to a substrate,
   (c) optionally, converting the liquid precursor into the solid or gel nanocomposite material,
   (d) generating a potential difference in the solid or gel nanocomposite material to cause a directed diffusion of the nano scale particles in the matrix material and a concentration gradient of the nanoscale particles in the matrix material; and
   (e) at least one of thermally and photochemically curing the solid or gel nanocomposite material comprising the concentration gradient to form the optical element.

33. The process of claim 1, wherein the optical element has an angle of view of above 10°.

34. The process of claim 1, wherein the optical element comprises a hologram.

35. The process of claim 34, wherein the process comprises making a planar gradient index lens which comprises the optical element.

36. The process of claim 1, wherein the process comprises making a head-up display which comprises the optical element.

37. The process of claim 1, wherein the process comprises making a head-down display which comprises the optical element.

38. The process of claim 1, wherein the process comprises making an optical waveguide which comprises the optical element.

39. The process of claim 1, wherein the process comprises making an optical data storage medium which comprises the optical element.

40. The process of claim 32, wherein the optical element has an angle of view of above 10°.

\* \* \* \* \*